Dec. 9, 1969
G. W. JACKSON
3,482,863
FLUID FITTING PLUG ASSEMBLY
Original Filed Sept. 13, 1965
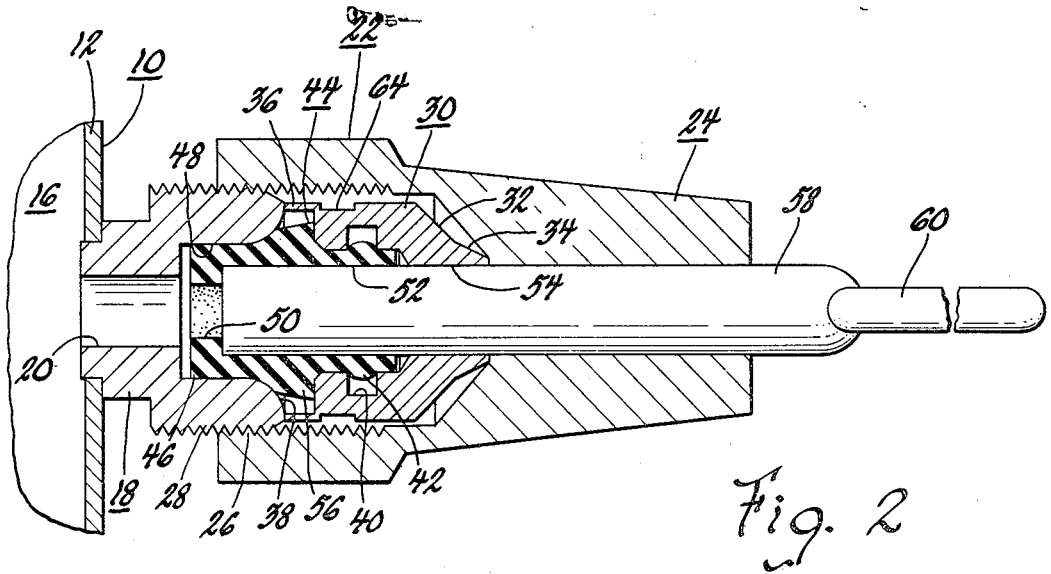
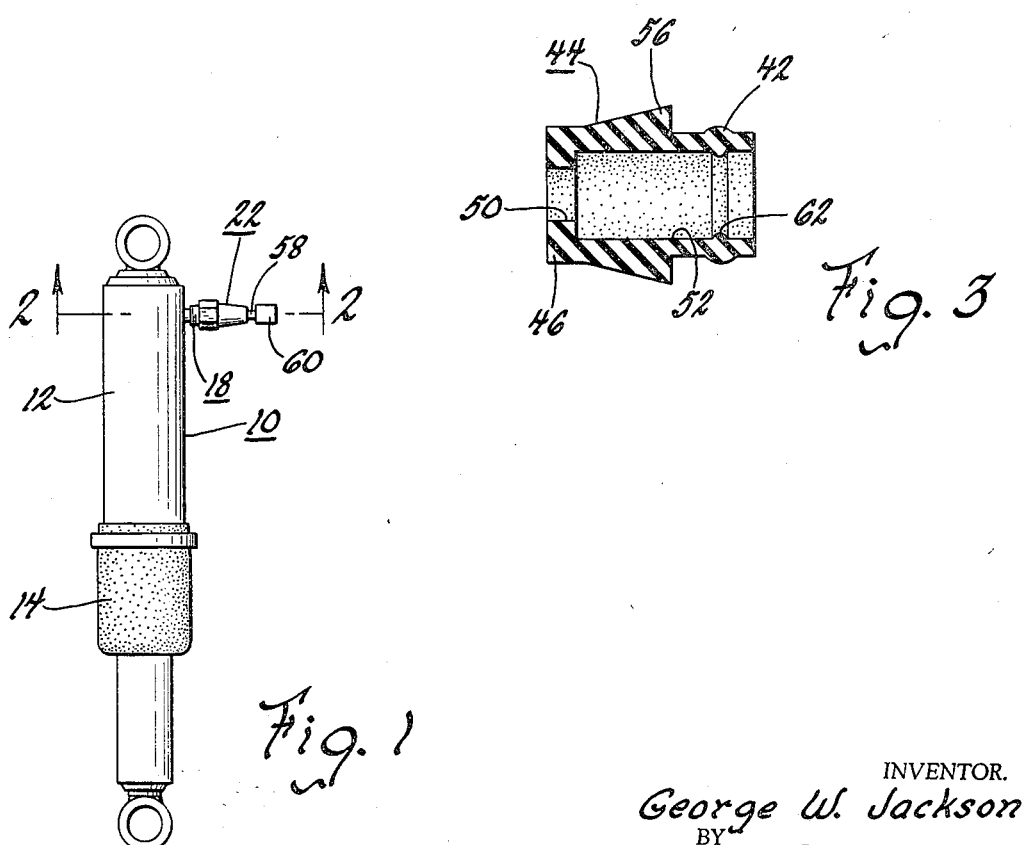
INVENTOR.
George W. Jackson
BY
J.C. Evans
HIS ATTORNEY

United States Patent Office 3,482,863
Patented Dec. 9, 1969

3,482,863
FLUID FITTING PLUG ASSEMBLY
George W. Jackson, Dayton, Ohio, assignor to General Motors Corporation, Detroit, Mich., a corporation of Delaware
Continuation of application Ser. No. 487,007, Sept. 13, 1965. This application Jan. 19, 1968, Ser. No. 699,274
Int. Cl. F16b 7/00; F16d 1/00
U.S. Cl. 287—126                                2 Claims

ABSTRACT OF THE DISCLOSURE

In preferred form, a tube coupling and plug assembly including an adjustable coupling nut surrounding a sleeve member having a deformable tube gripping end and a torque resisting coupling positioning flange on its opposite end, a seal member having one end supported within and locked to the sleeve and including a tubular end located axially outwardly of the sleeve adapted to be sealingly seated in a fluid fitting, an elongated plug removably seated in the seal member having a flat end engaging the tubular end of the seal member and having the outer peripheral surface thereon sealingly engaged with the seal member between its tubular end and its sleeve supported end, a radially inwardly directed sealing ridge on the seal member applying localized pressure on the plug to prevent its removal from the seal member, and a radially outwardly directed surface on the seal member engageable with the flange carrying end of the sleeve member to prevent leakage radially outwardly of the sleeve.

---

This application is a continuation of Ser. No. 487,007, filed Sept. 13, 1965, now abandoned.

This invention is directed to a fluid fitting plug and more particularly to a combination coupling and plug assembly.

In many manufacturing operations, it is necessary to plug openings in an enclosure for forming a chamber to prevent the entrance of moisture or the like interiorly thereof.

In such arrangements, it is desirable to block the fluid fitting into the enclosure by a plug assembly that is easily inserted in place and easily removable following the manufacturing process and wherein the plug positively seals the entrance of moisture, dirt or the like into the enclosure.

Accordingly, it is an object of this invention to improve fluid fitting plug assemblies by the provision of a coupling and plug combination that includes a preassembled, selectively positioned coupling member that is manually adjustable for positioning a tube locking member and sealing member in operative position with a tube inserted interiorly of the coupling and wherein in one of the adjusted positions, the tube locking member and seal member are positioned to receive an elongated removable plug that cooperates therewith to effect a sealed closure of a tube fitting associated with the coupling member.

Further objects and advantages of the present invention will be apparent from the following description, reference being had to the accompanying drawings wherein a preferred embodiment of the present invention is clearly shown.

In the drawings:

FIGURE 1 is a view in elevation of a combination air spring and shock absorber unit including the tube fitting and plug combination of the present invention;

FIGURE 2 is an enlarged view in horizontal section taken along the line 2—2 of FIGURE 1; and FIGURE 3 is a vertical, sectional view of a sealing member in the improved combination.

Referring now to the drawing, in FIGURE 1 a combination air spring and shock absorber unit 10 is illustrated including an upper tubular member 12 and a flexible sleeve 14 that cooperate to form a pressurizable chamber 16. Further details of the air spring and shock absorber unit 10 are set forth in United States Patent No. 3,063,702, issued Nov. 13, 1962, with it being understood that the details of the combination unit form no part of the present invention. The pressurizable chamber 16 of the unit 10 is merely representative of one enclosure formed chamber of a type that has a fluid connection for passing fluid into the pressurizable chamber. Units of this type, during their manufacture, are passed through various stations at which dirt, moisture or the like are present that must be isolated from the pressure chamber such as pressure chamber 16 in the illustrated unit. One example of such a station is a wash station at which the unit is immersed in a cleaning fluid for removing oil, dirt or the like therefrom prior to shipping.

In the illustrated arrangement a fluid fitting 18 is secured on the tubular member 12 and has a passageway 20 therethrough which communicates the pressure chamber 16 with the exterior of the unit. In accordance with certain of the principles of the present invention, the fluid fitting 18 is associated with an improved tube coupling and plug assembly 22 that prevents the entrance of wash fluid or the like into the pressurizable chamber 16 during manufacturing operations and shipping of the unit 10. The assembly 22 includes a tubular coupling member or tube nut 24 having an internally threaded end 26 threadably received about an externally threaded end 28 on the fluid fitting 18. Within the tube nut 24 is located a sleeve member 30 that has an inclined surface 32 on one end thereof that merges with a thin-sectioned annular nose portion 34 that is in engagement with an internal surface of the tube nut 24, as best seen in FIGURE 2. On the opposite end of the sleeve element 30 is located an annular, thin-sectioned flange 36 that engages an inwardly curved nose 38 of the fluid fitting 18. The sleeve element 30 further includes a large diameter annular groove 40 which receives an annular outer protuberance 42 on a seal member 44 formed of a resilient material such as rubber. The seal member 44 has a tubular end 46 thereon located within an end opening 48 of the fluid fitting 18. The tubular end 46 includes an end opening 50 therein for communicating the passageway 20 of the fitting 18 with a large diameter opening 52 in the seal member 44. The passageway 20, end opening 50 and large diameter opening 52 are coaxially arranged with one another and with respect to an end opening 54 in the sleeve member 30.

In the illustrated arrangement the seal member 44 includes an outwardly flared surface portion 56 having a truncated conical shape that has the outer peripheral portion thereof located between the inboard end of the sleeve 30 and the curved nose portion 38 of the fitting 18.

The assembly 22 is preassembled into the position shown in FIGURE 2 on the tube fitting 18 or a like member so that the thin-sectioned flange 36 and nose portion 34 of the sleeve 30 are located in engagement with the fluid fitting 18 and tube nut 24. This position is determined by manual tightening of the tube nut 24 on the fitting 18 until an initial resistance is detected. The adjustment of the nut 24 to obtain this disposition of elements is a first preselected adjusted position at which the seal element 44 has the surface 56 thereon resiliently held axially between the end of the fitting 18 and the sleeve 30 to seal the flange carrying end of sleeve member 30. Furthermore, the nose portion 34 is disposed to maintain the end opening 54 in the sleeve 30 at a diameter substantially equal to the diameter of the opening 52 in the seal member 44. An elongated pin 58 of high density polyethylene is inserted through the tube nut 24, sleeve 30 and seal 44, as shown in FIGURE 2, so that a flat end 59 thereon sealingly engages member 44 around the opening 50 in its tubular end 46 and the outer periphery or surface of pin 58 fits in a large diameter opening 52 to sealingly engage seal member 44 between its tubular end 46 and an opposite end 61 thereon to prevent fluid leakage across the tube coupling and plug assembly 22 interiorly of the pressure chamber 16. The seal member 44 includes a radially inwardly directed protuberance or sealing ridge 62 thereon that engages the portion of the pin 58 between ends 46, 61 directed into the opening 52 of the seal member 44 to apply a local pressure to the pin to keep it in place within the seal member 44. The pin 58 includes a flattened end portion 60 serving as a handle for removal. When the pin 58 is inserted in place, as shown in FIGURE 2, it cooperates with the resilient seal member 44 to positively prevent the entrance of wash fluid or the like into the pressurizable chamber 16 of the unit. Furthermore, the inserted plug 58 and cooperating seal member 44, during shipping, will prevent undesirable contaminants from entering the unit 10.

Following shipping, the unit can be readily conditioned for use by insertion of a tube in place of the plug 58. When a tube is placed within the openings 52, 54 of the assembly 22, the tube nut 24 can then be turned inboard on the fluid fitting 18 so as to cause the nose 34 to be crimped inwardly into interlocking engagement with the tube and to further cause the flange portion 36 to break off and be displaced into a peripheral opening 64 on the sleeve whereby the sleeve 30 has the inboard end thereof positioned to tightly compress the seal surface 56 in sealing engagement with the nose 38 of the fitting 18 to effect a second sealing action.

By virtue of the above-described arrangement, a combination tube coupling and plug assembly is disclosed that effects a protective cap function during washing operations or the like and a subsequent tube coupling function merely by selectively positioning a tube nut into first and second predetermined threaded positions on a fluid fitting and selectively inserting and removing a pin member with respect to the tube nut. The tube coupling portion of the assembly is preassembled to avoid the necessity for handling small parts in the field and the assembly is characterized by a small number of economical parts to carry out a plurality of sealing and interlocking functions without requiring any steps other than removal and insertion of a single pin element.

While the embodiment of the present invention as herein disclosed constitutes a preferred form, it is to be understood that other forms might be adopted.

What is claimed is as follows:

1. A fluid fitting plug assembly comprising a fluid fitting, a tube nut engaging said fluid fitting, a sleeve member supported between said fluid fitting and said tube nut having a first end and a second end, an internal groove in said sleeve member between said first and second ends, said first and second sleeve member ends engaging said fluid fitting and said tube nut for maintaining a predetermined distance therebetween, a resilient seal member having one end thereof supported within said sleeve member, said one end including a radially outwardly directed outer surface protuberance interlockingly received by said sleeve member groove, said resilient seal member including a tubular end located axially outwardly of said sleeve member and received within said fluid fitting in sealing engagement therewith, said seal member including a radially outwardly flared outer surface thereon between said protuberance and said tubular end, said flared outer surface of said seal member being pressed in resilient sealing engagement between said fluid fitting and said sleeve member to prevent fluid leakage radially outwardly of said sleeve member, said seal member including an inner surface defining an axial opening therethrough, said sleeve member having an axial opening therethrough coaxially aligned with said seal member opening, an elongated solid plug removably received within said coaxially aligned openings, said elongated plug having a smooth uninterrupted outer surface thereof sealingly engaging said inner surface of said seal member between its tubular end and its sleeve supported end for preventing fluid leakage through said coaxially aligned openings, said elongated plug including a flat surface on one end thereof engaging the tubular end of said seal member to further extend the sealing engagement between said plug and said seal member, said plug having an extended surface on the opposite end thereof defining a handle for gripping the plug to remove it from its sealing location within said seal member.

2. A fluid fitting plug assembly comprising a fluid fitting, a tube nut engaging said fluid fitting, a sleeve member supported between said fluid fitting and said tube nut having a first end and a second end, an internal groove in said sleeve member between said first and second ends, said first and second sleeve member ends engaging said fluid fitting and said tube nut for maintaining a predetermined distance therebetween, a resilient seal member having one end thereof supported within said sleeve member, said one end including a radially outwardly directed outer surface protuberance interlockingly received by said sleeve member groove, said resilient seal member including a tubular end located axially outwardly of said sleeve member and received within said fluid fitting in sealing engagement therewith, said seal member including a radially outwardly flared outer surface thereon between said protuberance and said tubular end, said flared outer surface of said seal member being pressed in resilient sealing engagement between said fluid fitting and said sleeve member to prevent fluid leakage radially outwardly of said sleeve member, said seal member including an inner surface defining an axial opening therethrough, said sleeve member having an axial opening therethrough coaxially aligned with said seal member opening, an elongated solid plug removably received within said coaxially aligned openings, said elongated plug having a smooth, uninterrupted outer surface thereof sealingly engaging said inner surface of said seal member between its tubular end and its sleeve supported end for preventing fluid leakage through said coaxially aligned openings, said elongated plug including a flat surface on one end thereof engaging the tubular end of said seal member to extend the sealing engagement between said plug and said seal member, said seal member including a radially inwardly directed sealing ridge within said opening therethrough, said sealing ridge engaging the outer surface of said elonated plug between its flat surface end and the opposite end of said sealing member to apply a localized pressure thereagainst for maintaining said plug in place within said coaxially aligned openings and to apply a force thereon to resist inadvertent removal of the plug from its seated position within said seal member and said sleeve member, said smooth uninterrupted outer surface of said plug being slidably movable with respect to said sealing ridge on said seal member when said plug is removed from its sealing seated relationship within the coaxially aligned openings of said seal member and said sleeve member to allow fluid flow therethrough.

References Cited

UNITED STATES PATENTS

| | | | |
|---|---|---|---|
| 1,793,803 | 2/1931 | Hurley et al. | 287—126 |
| 2,862,732 | 12/1958 | Gillou | 285—382.7 |
| 3,332,708 | 7/1967 | Jackson et al. | 285—382.7 |

DAVID J. WILLIAMOWSKY, Primary Examiner

WAYNE L. SHEDD, Assistant Examiner

U.S. Cl. X.R.

285—3